United States Patent [19]

Durell

[11] Patent Number: 5,136,433
[45] Date of Patent: Aug. 4, 1992

[54] OPTICAL POSITIONER AND CONNECTOR

[76] Inventor: William E. Durell, 41310 N. Westlake, Antioch, Ill. 60002

[21] Appl. No.: 529,665

[22] Filed: May 29, 1990

[51] Int. Cl.⁵ .................................................. G02B 7/02
[52] U.S. Cl. .................................. 359/829; 359/819; 359/822
[58] Field of Search .......................... 350/245-257, 350/522-525, 320, 96.15, 96.17, 96.18, 96.2-96.22; 269/322-328, 11, 903, 904; 359/811-830, 894-896, 554-557, 871-872, 879-882; 356/400

[56] References Cited

U.S. PATENT DOCUMENTS

| | | | |
|---|---|---|---|
| 3,788,733 | 1/1974 | Breglia et al. | 350/287 |
| 3,870,398 | 3/1975 | Love | 350/173 |
| 4,431,258 | 2/1984 | Fye | 350/166 |
| 4,595,265 | 6/1986 | Hodgson et al. | 350/525 |
| 4,652,095 | 3/1987 | Mauro | 350/531 |
| 4,655,548 | 4/1987 | Jue | 350/245 |
| 4,671,613 | 6/1987 | Buhrer | 350/174 |
| 4,723,841 | 2/1988 | Roy et al. | 350/359 |
| 4,726,647 | 2/1988 | Kakii et al. | 350/96.21 |
| 4,787,710 | 11/1988 | Durell | 350/173 |
| 4,812,029 | 3/1989 | Onanhian | 350/523 |
| 4,840,450 | 6/1989 | Jones et al. | 350/320 |
| 4,859,029 | 8/1989 | Durell | 350/173 |
| 4,902,094 | 2/1990 | Shank | 350/96.2 |
| 4,907,853 | 3/1990 | Hiratsuka | 350/96.2 |
| 4,936,655 | 6/1990 | Leib et al. | 350/245 |

FOREIGN PATENT DOCUMENTS

| | | |
|---|---|---|
| 2516254 | 5/1983 | France . |
| 55-35354A | 3/1980 | Japan . |

OTHER PUBLICATIONS

Newport Corporation, 1983-1984 Catalog, pp. 118-121.
Newport Corporation publication "Precision Coupler for Polarization-Preserving Single Mode Fibers".
Newport Corporation Tech Note "Design and Testing with Holography" pp. 1-8.

*Primary Examiner*—Bruce Y. Arnold
*Assistant Examiner*—Thong Nguyen
*Attorney, Agent, or Firm*—Kinzer, Plyer, Dorn, McEachran & Jambor

[57] ABSTRACT

A positioner for accurately and precisely positioning an optical member such as a lens aligned with the tip of an optical fiber in relation to an optical device such as a beam launcher/splitter; the positioner includes a tilt base mounted in a frame and angularly displaceable about orthogonal X and Y axes defined by three ball bearings all engaging one surface of the tilt base and all biased against the tilt base. Two differential screws mounted on the frame engage two of the ball bearings to effect angular yaw and pitch adjustments. The tilt base is connected to a retainer support in turn connected to a retainer member; two additional differential screws engage the support through further ball bearings to effect linear movements of the retainer member along the X and Y axes. The retainer member includes a lens and an adapter aligned along the Z axis with an optical fiber cable whose tip is releasably connected to the adapter; the adapter has an internal flange that accurately locates the tip of the optical fiber at the focal point of the lens.

23 Claims, 5 Drawing Sheets

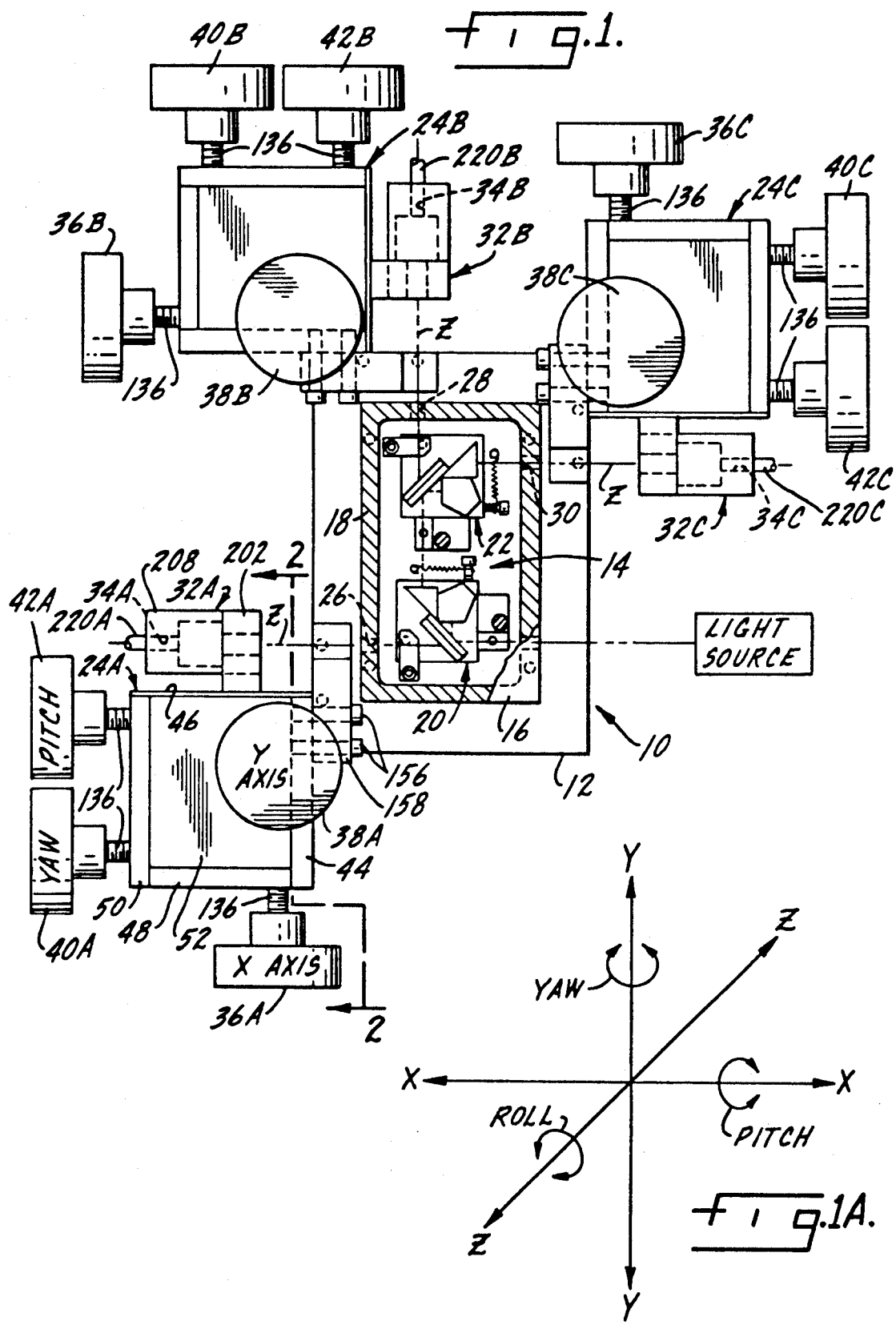

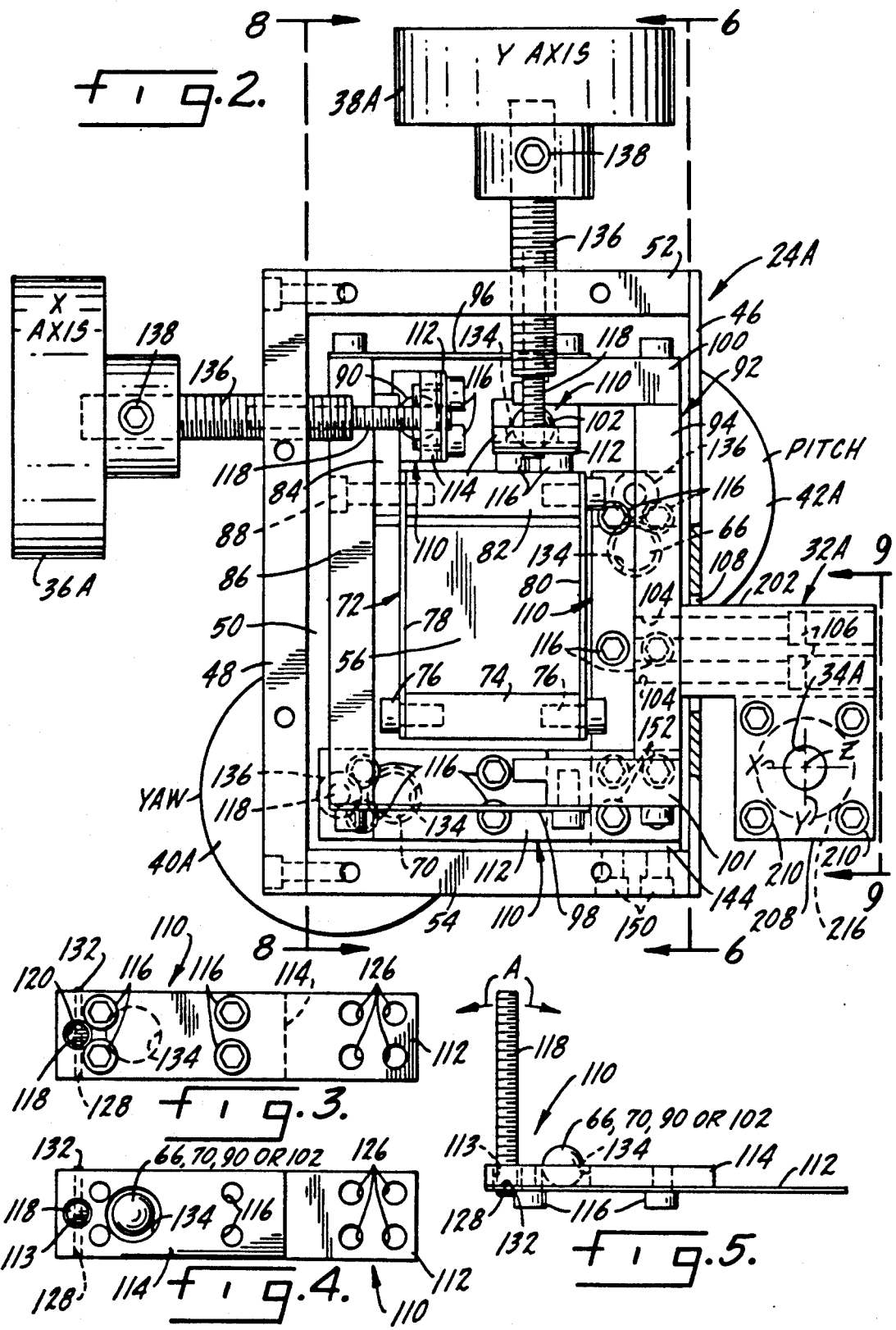

OPTICAL POSITIONER AND CONNECTOR

BACKGROUND OF THE INVENTION

1. Technical Field

This invention relates generally to a micropositioner for use with an optical fiber or other optical element and to a connector used with the positioner and in particular to an optical fiber connector and micropositioner for minimizing loss of light or other radiation in a connection between optical elements.

2. Related Patents

This invention is related to U.S. Pat. Nos. 4,787,710 and 4,859,029, both issued to the inventor of the present invention; each is incorporated herein as if fully set forth.

3. Background

An optical fiber connector is used to connect an optical member, such as one end of a discrete optical fiber, to another optical device so as to provide for continuous transmission of light between the optical device and the fiber. Examples of such optical devices are a light source or other transmitting element, such as an LED, a light receiver, a polarized laser, or another fiber. Complete transmission of all available light between optical elements is not possible because of the discontinuities of the index of refraction which occur as the light beam passes from the element which transmits it into a medium such a air and then into another element, such as a receiving fiber, lens, or other optical element.

Various techniques have been proposed for minimizing transmission losses when a light beam is transmitted to or from an optical fiber; these have included the use of positioners and the use of an intermediate medium having an index of refraction that matches that of the optical fiber. These arrangements tend to increase the light transmission, but they usually require extensive manual adjustment or are inadequate for maximizing the amount of light transmitted. The known connectors do not provide the ease of operation or the precise adjustment of the position and attitude of the optical elements or fiber ends that are characteristic of the present invention.

SUMMARY OF THE INVENTION

It is a principal object of the invention to provide a device which permits the maximum transmission of light through a fiber waveguide connection, even when the separation between optical elements is relatively large.

It is another object of the invention to provide means for precisely and accurately positioning an optical fiber in regard to virtually all available degrees of freedom so as to provide minimum loss of light in an optical fiber or other optical connection during transmission; related aspects of this object are to provide a micropositioner capable of accurate and precise positioning of an optical element in X, Y, pitch and yaw directions, and to provide an interface between an optical fiber and the positioner which affords a repeatable and precise alignment of the optical fiber with minimum loss of light.

Another object of the invention is to provide a capability of removing and later replacing an optical fiber returning the fiber to the same position relative to the connector when it is replaced in the connector.

Accordingly, the invention relates to a positioner for accurately and precisely positioning and aligning an optical member in operative relation to an optical device with respect to at least three independent parameters, one of those parameters being a linear axis and one being an angular parameter of displacement about that linear axis. The positioner comprises: a frame, a tilt base member mounted on the frame for angular displacement about a given axis for alignment with respect to a given angular parameter, and retainer support means, mounted on the frame and mechanically connected to the tilt base member for angular movement therewith, the support means including a retainer support member axially movable along the given axis for alignment with respect to a given linear parameter. The positioner further comprises retainer means, including a retainer member mounted on the retainer support member, for retaining an optical member in predetermined position and alignment in the retainer member and exposed to the optical device for transmission of radiation therebetween along a Z axis, orthogonal to the given axis, the Z axis comprising an operational axis of the optical element. There is a tilt adjustment means, mounted on the frame and including a tilt adjustment anti-friction bearing engaging the tilt base member, for controlled angular displacement of the tilt base member about the given axis to adjust alignment of the optical device with respect to the given angular parameter, and tilt biasing means biasing the tilt base member into engagement with the tilt adjustment anti-friction bearing; there is also an axial adjustment means, mounted on the frame and including an axial adjustment anti-friction bearing engaging the retainer support means, for controlled movement of the support member along the given axis to adjust alignment of the optical device with respect to the given linear parameter, and axial bias means biasing the retainer support means into engagement with the axial adjustment antifriction bearing.

BRIEF DESCRIPTION OF THE DRAWINGS

FIG. 1 is a plan view, with one cover cut away, of a dual continuously variable beam splitter utilizing three separate and independent positioners according to the present invention;

FIG. 1A is a diagram used to explain adjustments of positioners in the beam splitter of FIG. 1;

FIG. 2 is an enlarged front elevation view of one positioner, taken approximately along line 2—2 in FIG. 1;

FIG. 3 is a bottom view of an adjustable motion control assembly utilized in the present invention;

FIG. 4 is a plan view of the motion control assembly shown in FIG. 3;

FIG. 5 is an elevation view of the motion control assembly shown in FIG. 3;

DESCRIPTION OF THE PREFERRED EMBODIMENTS

Figure 6:
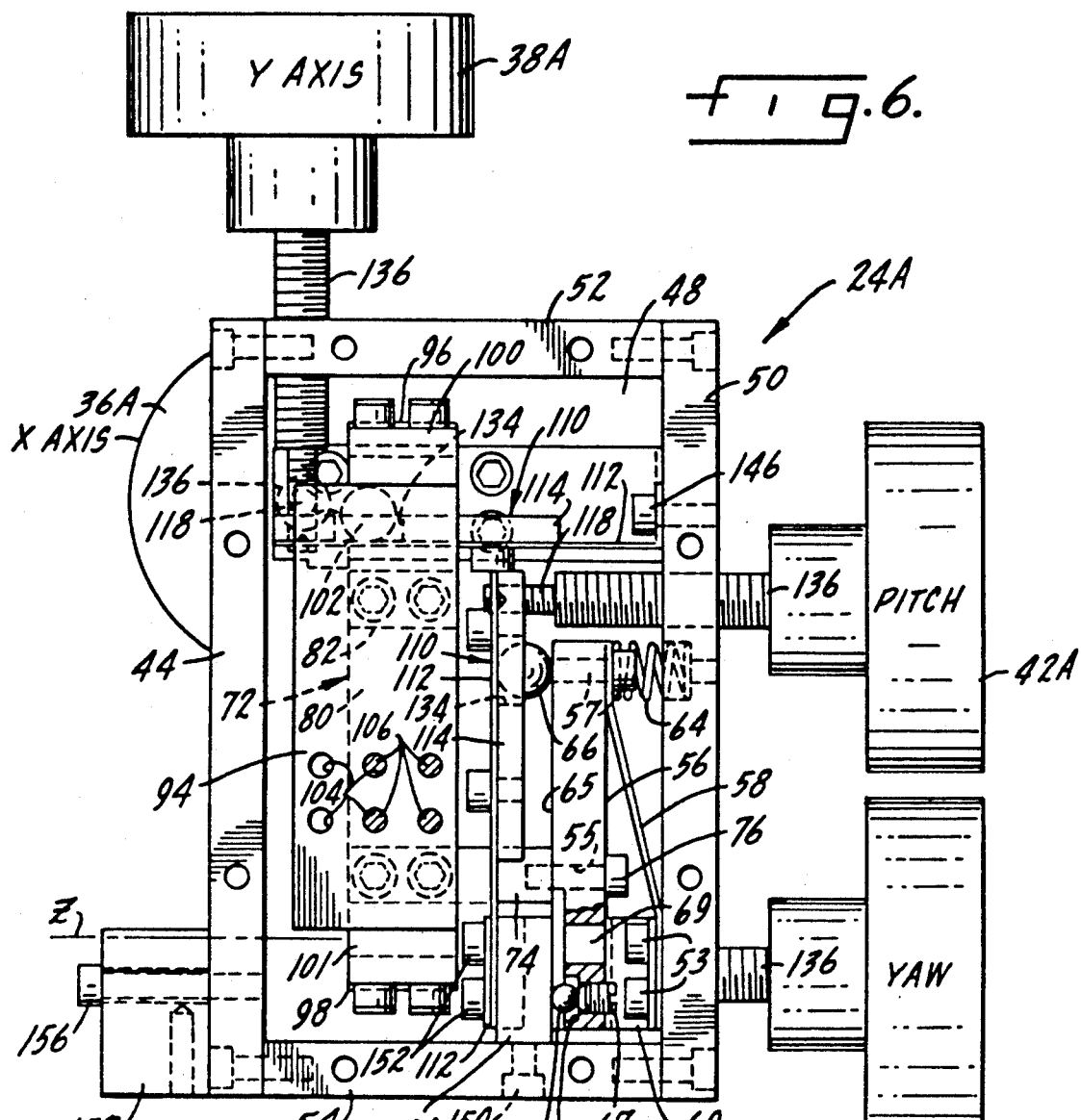
FIG. 6 is a side elevation view taken approximately along line 6—6 in FIG. 2.

FIG. 1 affords a plan view of a continuously variable ratio beam splitter/launcher 10, mounted on a frame 12 and including an optical apparatus 14, shown with the top 16 of an inverted generally cup-shaped cover 18 cut away to disclose two optical arrays 20 and 22. Details of the construction and operation of the beam splitter/launcher 10 are set forth in U.S. Pat. No. 4,859,029 and its predecessor U.S. Pat. No. 4,787,710, both incorporated by reference herein. The description in U.S. Pat. No. 4,859,029 also applies to the optical arrays 20 and 22 of the beam splitter/launcher 10.

FIG. 1 further shows three fiber optic positioners 24A, 24B, and 24C; all have the same construction, and each is connected to and utilized in conjunction with the beam splitter/launcher 10. Each of the positioners is used to align and position an end of one of three fiber optic light transmission elements 220A, 220B and 220C to receive output beams that emerge from apertures 26, 28 and 30, respectively, in the cover 18 of device 10, like the positioners described in U.S. Pat. No. 4,859,029. There are three retainers 32A, 32B and 32C connected to positioners 24A, 24B and 24C respectively. Retainer 32A houses and retains one end of the optical fiber 220A in a predetermined position in a fiber aperture 34A (shown in phantom). Retainers 32B and 32C serve the same function, positioning fiber optic elements 220B and 220C in two apertures 34B and 34C, respectively. The optical fibers each have a connector adapted for insertion into one of the apertures 34, as explained below.

FIG. 1A illustrates the parameters that each of the positioners 24A, 24B and 24C, and their retainers 32A, 32B and 32C, must control. Each positioner provides precisely controlled movement and alignment of its retainer linearly along two orthogonal axes X and Y. In addition, each positioner affords precisely controlled angular movement of its retainer about the X and Y axes, as indicated by the pitch and yaw arrows in FIG. 1A. Each retainer 32A, 32B, and 32C retains an optical device, such as a lens, at a predetermined location along a Z axis orthogonal to the X and Y axes; rotation of that device about the Z axis is indicated by the roll arrow in FIG. 1A. Thus, for each positioner 24 and its retainer 32, an optical element is controlled and aligned for three linear parameters (X, Y, and Z) and three angular parameters (pitch, yaw, and roll).

Positioner 24A has four adjustment knobs 36A, 38A, 40A and 42A for adjusting the position and attitude of retainer 32A. It should be understood that the discussion of position and attitude for the positioner 24A is always relative to the retainer 32A taken through the centerline of aperture 34A along which an optical fiber would be aligned.

Utilizing the positioner 24A as an example, adjustment of position along an X axis is made by knob 36A, and adjustment relative to a Y axis by knob 38A. Angular adjustments in attitude are made about the X axis (pitch) by knob 42A and about the Y axis (yaw) by knob 40A. The ease and convenience provided by a single device that precisely retains and incrementally adjusts both the position and attitude of an optical fiber will be appreciated by those having skill in the art. The positioners 24B and 24C are each provided with like adjustment knobs (36B, 38B, 40B and 42B, and 36C, 38C, 40C and 42C) and function in the same way as positioner 24A.

Figure 8:
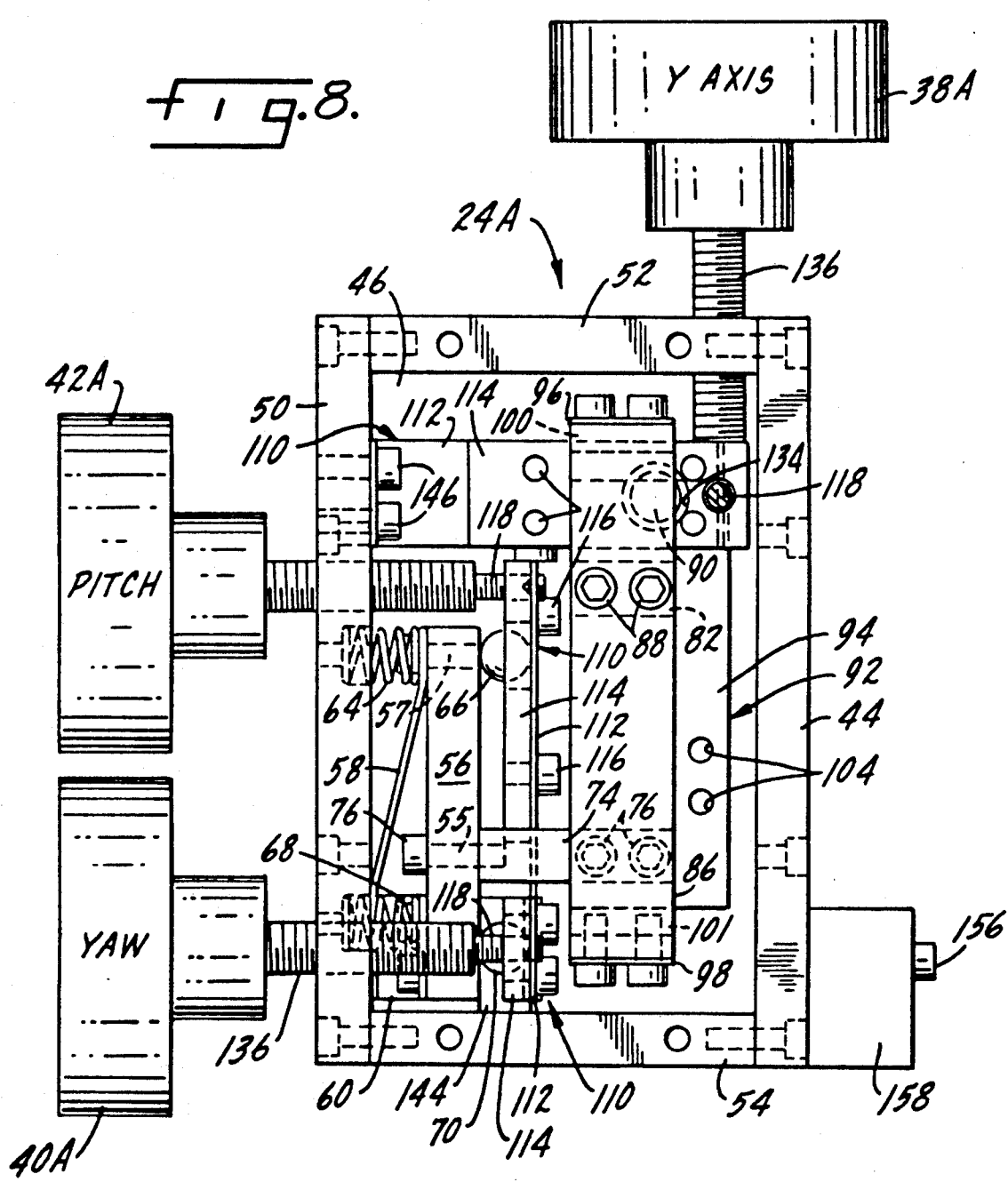
FIG. 8 is a side elevation view taken approximately along line 8—8 in FIG. 2.

FIGS. 2, 6 and 8 are enlarged views of positioner 24A taken from three orthogonally related directions. FIG. 2 is a front view and FIGS. 6 and 8 are each side views of the positioner. Common elements in these views and in the other figures are referenced by the same reference characters. A front cover plate 44 (see FIG. 1) has been removed in FIG. 2 for illustrative purposes. Similarly, a side cover plate 46 (FIG. 2) has been omitted from FIG. 6 and a side cover plate 48 (FIG. 2) is omitted from FIG. 8. A back cover plate 50, a top cover plate 52, and a bottom cover plate 54, shown in each of FIGS. 2, 6 and 8, complete the housing of positioner 24A.

The construction and detailed structure of a preferred embodiment of positioner 24A will now be discussed, particularly with reference to FIGS. 2, 6 and 8. A tilt base plate 56 is mounted on back cover plate 50 by means of two orthogonally oriented leaf springs 58 and 60; plate 56 is held in place on springs 58 and 60 by screw 57 threaded into tapped apertures in tilt base plate 56. Leaf springs 58 and 60 provide support and limit the motion of tilt base plate 56 to angular movements about two axes, pitch movement about an X axis and yaw movement about a Y axis. Each axis is approximately centered at a ball bearing 62, FIG. 6.

Figure 7:
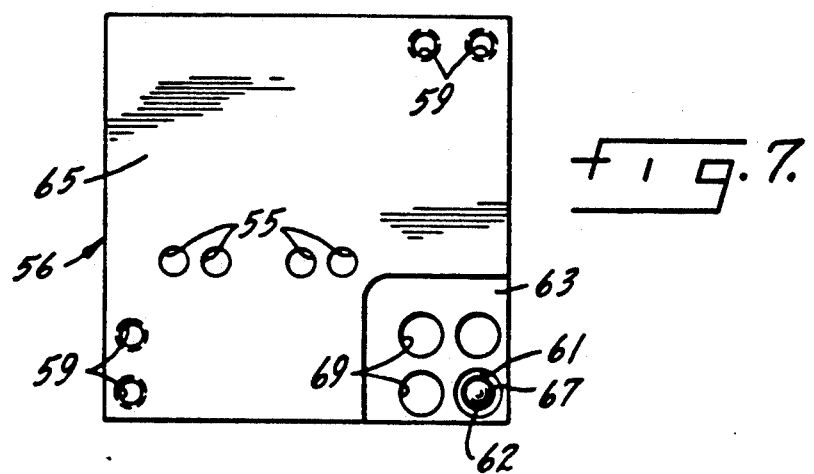
FIG. 7 is a detail view of one element of the mechanism of FIGS. 1, 2 and 6.

Bearing 62 is disposed within a cylindrical bearing cage 61 bored into a recessed corner 63 of the tilt base plate 56, as shown in partial cross section in FIG. 6 and in the detail of FIG. 7. Recess 63 in the tilt base plate corner in which the bearing cage 61 is formed permits the ball bearing 62 to be disposed below the surface 65 of the remainder of tilt base plate 56; see FIGS. 6 and 7. A setscrew 67 is threaded into a hole in plate 56 and contacts bearing 62, providing for axial adjustment of the position of bearing 62 relative to the plane of surface 65 of tilt base plate 56.

An auxiliary coil spring 64 is positioned between back cover plate 50 and tilt base plate 56; see FIGS. 6 and 8. Spring 64 is compressed and, together with leaf spring 58, applies a biasing force to tilt base plate 56 so as to bias the tilt base plate against another spherical bearing 66. Ball bearing 66 preferably has a larger diameter than bearing 62. Similarly, another auxiliary coil spring 68 is interposed between back cover plate 50 and a surface of the tilt base plate 56; spring 68 is engaged with a corner of plate 56 that is diagonally disposed from the corner which spring 64 engages. Spring 68 is also compressed and, together with leaf spring 60, applies a biasing force to tilt base plate 56, biasing the tilt base plate against a ball bearing 70 (FIGS. 2 and 8). Bearing 70 preferably has a diameter substantially equal to that of bearing 66. Both sets of springs, 58, 64 and 60, 68, provide biasing forces to maintain constant contact between the two diagonally displaced surface areas of tilt base plate 56 and the spherical bearings 66 and 70, respectively.

Referring again to FIGS. 2, 6 and 8, an inner support assembly 72 [FIG. 2) is connected to tilt base plate 56 by an inner base member 74; the connection is made by appropriate means such as the illustrated hexagonal caphead screws 76. A plurality of apertures 55 through plate 56 (see FIG. 7) permit screws 76 to pass through the tilt base plate 56; the screws engage in tapped holes in the inner base member 74. FIG. 7, a detailed view of tilt base plate 56, illustrates the tapped holes 59 for screws 57 and the apertures 55 through which screws 76 pass. Recess 63 in plate 56 can be formed by machining or milling a corner of the tilt base plate. A plurality of apertures 69 through the recessed portion 63 of plate 56 (FIG. 7) allow access to a series of screws 53 (FIGS. 2 and 6). When tilt base plate 56 is angularly displaced, clearance is required for screws 53, which is permitted by the through holes 69 to extend through the plane of the surface of tilt base plate 56.

Inner base member 74 is connected by two leaf springs 78 and 80 to an inner spreader 82 which is supported by the leaf springs. Leaf springs 78 and 80 limit the motion of inner spreader 82 to one plane only, that plane being in a direction perpendicular to the main surfaces of the leaf springs. Inner spreader 82 is connected to an inner spacer 84 and to an outer base 86, the spacer 84 being disposed between leaf spring 78 and outer base 86 (FIG. 2). The inner support assembly 72, including outer base 86, spacer 84, leaf spring 78 and inner spreader 82 are all connected together by a plurality of fasteners such as the screws 88, as shown in FIGS. 2 and 8. Leaf springs 78 and 80 exert a biasing force on the inner support assembly 72, through the spacer 84, which biases inner spacer 84 against a ball bearing 90, FIGS. 2 and 8.

Spacer 84 and inner spreader 82 are further connected to an outer support assembly, generally designated as 92, FIG. 2. An outer spreader 94, also referred to as a retainer support, is connected to outer base 86 by two outer leaf springs 96 and 98, FIG. 2. Leaf springs 96 and 98 support outer spreader 94 and limit its motion to one plane only, defined by a plane perpendicular to the main surfaces of the leaf springs 96 and 98. Leaf springs 96 and 98 also bias another support spacer 100 against a spherical bearing 102, FIG. 2; the biasing force maintains constant contact between outer support spacer 100, as connected to leaf spring 96, and the ball bearing 102. A second outer support spacer 101 connects leaf spring 98 to the outer spreader 94.

The retainer support, member 94, also serves as a platform for retainer 32A, which is securely attached to retainer support 94 by a plurality of screws or other fasteners 106 passing through retainer apertures and engaged in tapped holes 104 in member 94. An aperture 108 of appropriate dimensions (shown in partial cross section in FIG. 2) within side cover plate 46 provides clearance for retainer 32 to pass through plate 46 into engagement with retainer support 94. Structural details of the retainer 32 are discussed below.

Motions of the tilt base plate 56 and of the related inner support assembly 72 are effected and controlled by two of four motion control assemblies 110, each connected to a mechanism that includes one of the two adjustment control knobs 40A and 42A. FIGS. 3-5 illustrate in detail the structure of one of these motion control assemblies 110. Thus, motion control assembly 110, FIGS. 3-5, comprises a leaf spring 112, a spring support member 114 rigidly connected to leaf spring 112, as by four mounting screws 116, and a threaded rod 118, preferably metal, projecting from an aperture 120 in the leaf spring 112 through an aperture 113 in the support member 114, in a direction generally perpendicular thereto. Leaf spring 112 also has a group of four attachment apertures 126 at the end of the spring opposite rod 118 (FIGS. 3 and 4) to allow for attachment of the leaf spring to other elements within the positioner 24A.

In the illustrated embodiment of motion control assembly 110, FIGS. 3-5, support member 114 has a transverse V-shaped groove 128 that is centered over the aperture 120 in leaf spring 112 and the aperture 113 in support member 114 in which rod 118 is mounted. Rod 118 has a hole drilled through its lower end; a pivot pin 132 is inserted through that hole (FIG. 5) and is engaged within the groove 128. Thus, pivot pin 132 is above the plane of contact of leaf spring 112 and support member 114 as seen in FIG. 5. Placement of leaf spring 112 over the support member and rod is facilitated because the short lower end of rod 118 ca extend through the aperture 120 in the leaf spring. Leaf spring 112 covers the groove 128 and pivot pin 132, retaining rod 118 in assembly 110 when mounting screws 116 are screwed into place. Support member aperture 113 has a diameter large enough to allow rod 118 to pivot about pin 132 through a limited angular range, as shown by arrows A in FIG. 5.

Alternative constructions for assembly 110, also providing for some angular motion of rod 118, are possible. For example, a flexible plastic or metal rod can be used for rod 118 instead of a rigid rod. A pliant rod will permit some angular motion. Such a rod can be screwed directly into a threaded tapped aperture in support member 114, or can be connected with a nut adjoining the leaf spring 112. In these arrangements, limited angular motion is afforded by bending of the flexible version of rod 118.

A bearing cage aperture 134 extends through support member 114 and, together with a portion of leaf spring 112, provides a cage for one of the spherical bearings (66, 70, 90, 102). The bearing cage aperture 134, has a diameter sufficient to surround its associated ball bearing 66, 70, 90 or 102) and also to permit a limited freedom of rolling motion for the bearing along the upper surface of leaf spring 112. The bearing cage 134 provides a retaining means for the ball bearing while simultaneously permitting the bearing the freedom required for rolling against the other adjacent elements of the positioner.

Referring again to FIGS. 2, 6 and 8, four separate and independently operable motion control assemblies 110 are included in positioner 24A; each motion control assembly is connected to one of the control adjustment knobs 36A, 38A, 40A and 42A and each assembly utilizes the construction illustrated by assembly 110, FIGS. 3-5. Each control adjustment knob is mounted on a hollow adjusting rod 136 having internal and external threads by appropriate means such as a setscrew 138 (FIG. 2). Each adjusting rod 136 has an internal bore having a diameter and thread which matches the external diameter and thread of an associated rod 118. The rods 136 are each threaded into a tapped hole in one of the cover members 48, 50 and 52. The external diameter of each adjusting rod 136 is large enough (e.g. 0.25 inches or 0.63 cm) to readily accommodate the diameter and length of threaded rod 118 within its internal bore. The external thread on each adjusting rod 136 has a pitch which is slightly less than the pitch of the thread of the associated rod 118.

Each adjusting rod or shaft 136 is thus threaded into a cover plate (48, 50 or 52) and onto a threaded rod 118. When a shaft 136 completes one revolution in a cover plate it also completes one revolution around its associated threaded rod 118. Due to the differences in pitch between the external and internal threads of each shaft 136, one revolution of shaft 136 displaces rod 118 a very small distance in an axial direction; the amount of displacement is directly dependent on the difference in pitch between the internal and external threads of shaft 136. This differential construction allows for precise control of the axial position of each rod 118.

Using the X axis knob 36A of FIG. 2 as an example, rotation in a clockwise direction causes adjusting rod 136 to advance to the right through cover plate 48. Adjusting rod 136 of knob 36A also advances axially, to the right over the associated threaded rod 118, which cannot rotate and which is connected to the leaf spring 112 of the motion control assembly 110 for knob 36A. However, because the thread on rod 118 has a higher pitch than the external thread of shaft 136, each rotation or portion of a rotation of rod 136 displaces that adjusting rod a greater axial distance than the axial movement of rod 118. Of course, the axial displacement of rod 118 results in a corresponding displacement of spring 112 and member 114 in the associated motion control assembly 110 for the X axis adjustment knob 36A.

The end of spring 112 in each motion control assembly 110 opposite its rod 118 is mounted directly onto a cover plate or alternatively is mounted on a bracket which is itself affixed to a cover plate. For convenience, each motion control assembly 110 is identified and referenced to the control knob which it engages. For example, the spring 112 of the motion control assembly 110 engaging the X axis knob 36A, which is associated with spherical bearing 90, is attached to back cover plate 50 by mounting screws 146, see FIG. 6. The leaf spring 112 of that particular assembly 110, for knob 36A, is bent perpendicularly to accommodate mounting directly onto cover plate 50. The motion control assembly 110 for adjustment knob 36A thus pivots between the end of member 114 and causes the bend in its leaf spring 112.

As shown in FIG. 6, a mounting bracket 144 is directly mounted onto the bottom cover plate 54 by suitable means such as a plurality of screws 150. The motion control assemblies 110 that are associated with control knobs 40A and 42A, respectively, are each mounted directly on bracket 144, perpendicularly to each other. The mounting screws 152 for these two control assemblies extend through the attachment apertures 126 in the springs 112 of these motion control assemblies 110 (see FIGS. 3 and 4) into tapped holes in the mounting bracket 144.

The threaded rods 118 are typically of a relatively small diameter with a 6-32 or other high pitch screw thread and may be made of metal, preferably plastic, brass, or stainless steel or other wear resistant resilient material. Leaf springs 112 preferably comprise stamped stainless spring steel. Support members, brackets, spacers and plates can be manufactured from appropriate materials, such as aluminum. The mounting screws are generally available and may comprise steel or other metal.

Operation of each motion control assembly 110 is essentially the same with regard to the control knob which it engages. Using the pitch control knob 42A and its motion control assembly 110 as an example, FIG. 6 provides the best view of that operation. The bearing cage 134 in member 114 of this control assembly retains ball bearing 66. Bearing 66 is biased against one corner of tilt base plate 56 by the leaf spring 112 of this assembly 110. Tilt base plate 56 is biased at that corner in the opposite direction by leaf spring 58 and coil spring 64, thus defining an equilibrium position for tilt base plate 56. Rotation of knob 42A provides an axial displacement for the movable end of spring 112 in the motion control assembly 110, as discussed above; this movement of spring 112 also allows displacement of ball bearing 66, altering the equilibrium previously existing between the elements associated with springs 112, 58 and 64. A new equilibrium is achieved, which necessarily displaces the corner of tilt base plate 56 that is directly adjacent spherical bearing 66.

A similar operation takes place with regard to the yaw control knob 40A which is associated with the other motion control assembly 110 mounted on bracket 144. FIGS. 2 and 8 best illustrate how the spring 112 of this assembly biases bearing 70 against a corner of tilt base plate 56, a corner which is diagonally opposed to the corner engaged by bearing 66. The inclination of that corner of the tilt base plate is thus made adjustable by the yaw control knob 40A.

During operation, ball bearing 66 permits tilt base plate 56 and the leaf spring 112 associated with bearing 66 to move freely in relation to each other, even though they each rotate around different points of attachment. This is also true of bearing 70 and its spring 112. The rotation and movement take place simultaneously as each leaf spring 112 effectively remains in constant contact with tilt base plate 56 through its associated bearing.

Bearing 66 also permits the motion control assembly 110 that is connected to the pitch control knob 42A to operate through back cover plate 50 while transmitting motion to tilt base plate 56. This is possible because bearing 66 is permitted to roll freely within its bearing cage 134. The confinement parameters provided by cage 134 are large enough to permit tilt base 56 to move from one extreme of its motion limits to the other extreme while avoiding contact between bearing 66 and the sides of its cage aperture 134. This eliminates a source of friction and provides for a continuously smoother, more precise operation of the positioner. The bearing 70 affords the same operational characteristics for yaw control 40A.

Referring again to FIG. 6, it is apparent that adjustment of set screw 67 axially displaces ball bearing 62 and adjusts the respective axes of rotation of the tilt base plate 56, the effective yaw and pitch axes of positioner 24A. Precise adjustment of the position of bearing 62 is important for providing for accurately controlled location of a point in the tilt adjustment where tilt base plate 56 is orthogonal to the frame in all directions at the point where both tilt adjustment screws 136 are in the exact middle of their total travel. This provides for equal angular displacement of tilt base plate 56 on both sides of a line orthogonal to the frame through the angle of displacement. Thus, rotation of the tilt base plate 56, and all the elements to which it is connected, is calibrated. Adjustment of one of the control knobs 40A or 42A affects only one of the respective degrees of freedom, i.e., yaw or pitch, without changing the other.

Angular displacement of the tilt base plate 56 occurs about one of two axes, each axis being defined by a pair of pivot points. One of these points is the ball bearing 62, surrounded by the first bearing cage 61 (FIG. 6). The other pivot point is the ball bearing which is disposed diagonally opposite to the one associated with and displaced by a particular control knob. For example, axial displacement of bearing 66 by adjustment of pitch control knob 42A displaces tilt base plate 56 angularly about a pitch axis defined by the positions of the two spherical bearings 62 and 70. Similarly, axial displacement of bearing 70 by adjustment of yaw control knob 40A displaces tilt base 56 angularly about a yaw axis defined by the positions of the ball bearings 62 and 66. Of course, these motions of plate 56 effect corresponding movements of the inner support assembly 72.

Control knobs 36A and 38A (FIG. 2) operate in a similar manner for control of X and Y axis positions, respectively. Control knobs 36A and 38A, however are used to adjust the position of the outer support assembly 92, which includes the outer spreader/retainer support 94. That is, adjusting the position of retainer support 94 adjusts the X axis or Y axis position of retainer assembly 32.

The Y axis control knob 38A associated with ball bearing 102 is biased by its associated motion control assembly 110 against the outer support spacer 100, FIGS. 2, 6 and 8. Adjustment of control knob 38A, in controlling motion of the retainer 32A along its Y axis, changes the equilibrium position of outer leaf springs 96 and 98, FIG. 2. As described above, springs 96 and 98 constrain the outer support spacers 100, 104 and outer spreader 94 to move in one plane only. Adjustment of control knob 38A provides a biasing force on spacer 100 in a direction parallel to the axis of the threaded shaft 136 of the Y axis control knob 38A. Thus, outer spreader/retainer support 94 is limited to motion along a single Y axis line in the X-Y plane, which is perpendicular to the surface of its spreader/retainer support 94 and perpendicular to outer leaf springs 96 and 98. Retainer assembly 32 is necessarily also limited to motion along this Y axis line.

The X axis adjustment, performed by control knob 36A, essentially duplicates the Y axis adjustment. Control knob 36A is attached to its own motion control assembly 110 having a bearing cage 134 which confines the associated ball bearing 90. Bearing 90 is biased against inner spacer 84; see FIG. 2. Adjustment of the position of the motion control assembly 110 for bearing 90 sets the position of inner spacer 84 in the X-Y plane, which is orthogonal to leaf springs 78 and 80 and to leaf springs 96 and 98. Leaf springs 78 and 80 constrain the motion of inner spacer 84 to a single line in the X-Y plane, i.e., the X axis direction. Motion of inner spacer 84 along the X axis necessarily also moves the outer base 86, together with the entire outer support assembly 92 and retainer assembly 32, along the X axis.

The operation of knob 36A to adjust the X axis position makes apparent another feature of the invention. The movement of outer support assembly 92 also moves outer support spacer 100 along the X axis and in a direction tangential to ball bearing 102. This motion would be difficult, if not impossible, were there a direct connection between the Y axis adjustment knob 38A and the outer support spacer 100. But the limited rolling motion of ball bearing 102 within its bearing cage 134 permits the desired motion of spacer 100. Moreover, the rolling motion of bearing 102 against the surfaces of spacer 100 and leaf spring 112 provides for very little friction and consequently very smooth adjustment of the retainer assembly 32 along both the X axis and the Y axis.

Similarly, motion of the tilt base plate 56 causes all elements within the micropositioner 24A to move in conjunction. Specifically, pitch adjustment is performed by rotating knob 42A. The biasing force of springs 58 and 64 is overcome by the resulting shift of the motion control assembly 110 associated with knob 42A and its bearing 66, causing the bearing to displace the adjacent corner of the tilt base plate 56 in a direction parallel to the axis of the adjusting rod 136. As described above, the tilt base plate adjacent bearing 66 rotates about an axis, in this case the pitch axis, which is generally defined by bearings 62 and 70. The pitch axis is essentially perpendicular to the X-Y plane defined above.

Rotation of tilt base plate 56 necessarily also tilts all elements attached thereto, i.e., inner base member 74, inner support assembly 72, outer support assembly 92 including retainer support 94, and retainer 32A. Tilting of these elements causes adjustment of the pitch angle of retainer 32A. The yaw adjustment for the positioner 24A essentially duplicates the pitch adjustment mechanism. Adjustment control knob 40A rotates tilt base plate 56 about a yaw axis generally defined by bearings 62 and 66, thus causing the rotation of all of the above-enumerated elements within the housing of positioner 24A, including retainer 32A. The overall relationship of the axes of adjustment is a shown in FIG. 1A.

Again the efficacy and desirable features provided by the rolling motion of the spherical bearings 66, 70, 90 and 102 become apparent. Specifically, smooth and continuous angular adjustments for yaw and pitch are provided. For example, inner spacer 84 is displaced during a yaw or pitch adjustment, but because bearing 90 can roll along both surfaces of the inner spacer 84 and of the wall of its bearing cage 134, almost no friction is encountered. Adjustments are smooth, continuous and precise. Easy, efficient and precise position and attitude adjustments are rendered for retainer 32A and the optical fiber retained within that retainer.

A suitable means is provided for mounting the positioner 24A onto the frame of a device requiring micropositioning of optical elements. For example, mounting of positioner 24A onto frame 12 of the beam splitter/launcher 10 shown in FIG. 1 is achieved by a plurality of mounting screws 156 that mount the positioner on a bracket 158, which may be an integral element of the device or a separate member mounted onto the frame 12. The mounting means is not critical to the practice of the present invention, as long as a rough alignment is provided between a centerline or axis of the retainer 32A and any aperture, such as the light beam aperture 26 of beam splitter/launcher 10. Perfect initial alignment is not necessary because the adjustments provided by positioner 24A accurately align the retainer 32A with the optical device 10 after the positioner is mounted on the device.

The position and attitude of the optical fibers or waveguides must also be adjusted and maintained in regard to two remaining degrees of freedom, i.e., a Z axis direction and rotation of the optical fibers 220 or other optical elements associated with retainers 32A, 32B and 32C. In that regard, the invention provides a positioning system for maintaining constant position and attitude control along these two degrees of freedom for a retainer and associated optical waveguide or other optical element. Moreover, the Z axis and roll positions of the optical waveguide ar made repeatable if removal and replacement of the optical fiber or other waveguide in the retainer (e.g., retainer 32A) becomes necessary. The invention provides for the repeatability of these positions to a high degree of accuracy, requiring only a minimum of adjustment of the four available degrees of freedom by the positioner, such as positioner 24A.

Figure 9:
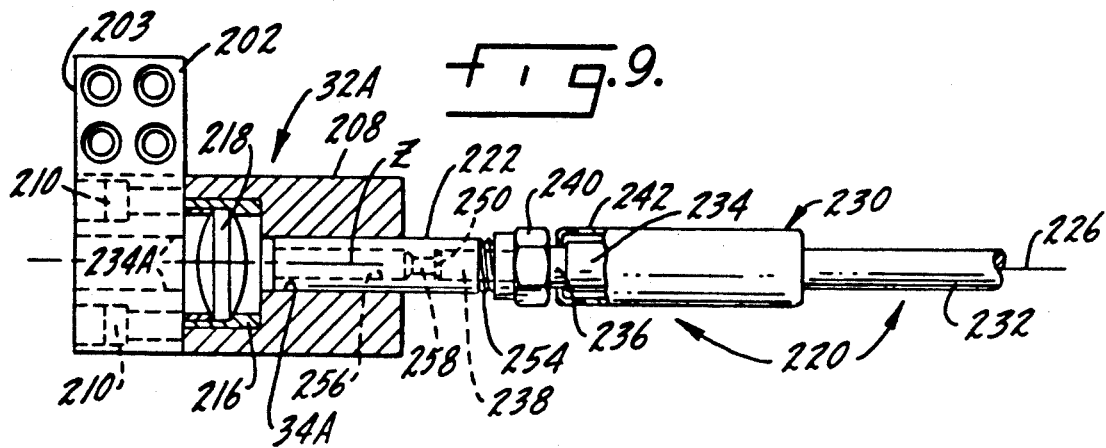
FIG. 9 is a plan view of a retainer employed in the present invention, in partial cross section, with an optical fiber assembly in the retainer.

FIG. 9 is a plan view, partially in cross-section, of the retainer assembly 32A connected to an optical waveguide, such as the optical fiber assembly 220. Reference may also be made to other parts of the drawings, such as FIG. 2, showing retainer 32A. The retainer assembly 32A comprises a retainer cover 202 which also serves as a mounting bracket for mounting the retainer 32A onto the positioner 24A (see FIG. 1). The mounting screws 106 attach cover 202 to the retainer support 94 of positioner 24A, see FIGS. 2 and 9. Cover 202 is attached to an optical element holder 208 by appropriate means such as four mounting screws 210. Aperture 34A through holder 208 is large enough to provide for a light beam passing therethrough along an axis Z substantially perpendicular to the surface 203 of cover member 202. There is an aligned continuation 234A of beam aperture 34A through member 202.

An optical housing 216 provides a holding and enclosing means for an optical element. In FIG. 9, the housing 216 is circular, and the optical element is a convex lens 218 concentrically disposed within an enlarged portion of aperture 34A. The optical element may be some other form of focussing means or may even be a light source, such as an LED, which has an axis requiring precise positioning and attitude adjustment by a positioner such as the micropositioner 24A (see FIGS. 1 and 2). FIG. 9 further illustrates connection of the optical fiber cable assembly 220 to retainer 32A through an adapter 222; see also FIG. 11. The adapter 222 is disposed in aperture 34A and is aligned with lens assembly 218 and with aperture 234A in cover member 202.

Figure 10:
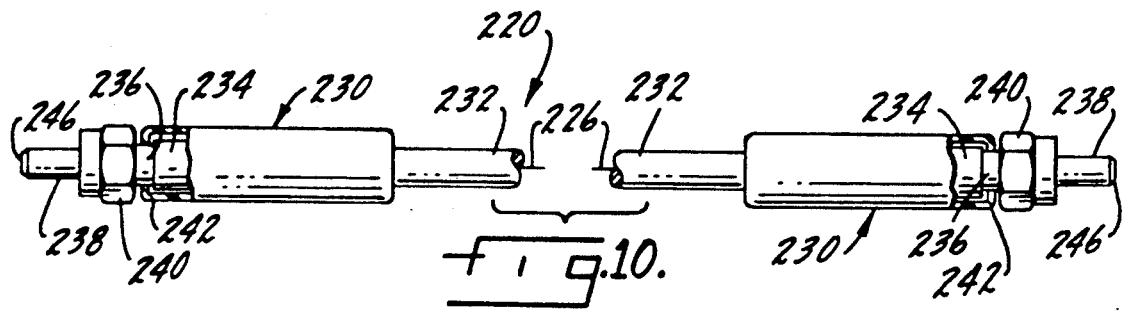
FIG. 10 illustrates the end portions of a fiber optic cable.

The optical fiber cable assembly 220, FIGS. 9 and 10, may be a standard fiber cable assembly having an optical fiber 226 which is suitable to the needs of the end user. Fiber assembly 220 includes, adjacent each end, an industry standard optical fiber connecting apparatus 230, such as an SMA 905 series connector, manufactured by OFTI, Amphenol, Augat, and others, see FIG. 10. Optical fiber assembly 220 includes a protective sheath or tubing 232, sometimes called a jacket, which protects most of the length of fiber 226 and its encasing cladding (not shown). Each connector 230 includes a crimp sleeve 234 crimped to a back shell 236, as well as an end ferrule 238 and a coupling nut 240. A strain relief boot 242 completes the standard coupling 230. A chamfered outer end 246 on the ferrule 238 provides for easier insertion of ferrule 238 into adapter 222, FIG. 9. Properly assembled, optical fiber 226 is coaxial with the axis Z; the tip and an adequate length of the fiber should be accurately aligned along that axis.

During manufacture of fiber assembly 220, each connector 230 is mounted on the sheath 232 with a portion of the optical fiber 226 extending out of the end of the associated ferrule 238. Connector 230 is affixed to the protective sheath 232. The end of optical fiber 226 is ground and polished such that the outer end of optical fiber 226 is flush with the outer end surface 246 of ferrule 238 at the end of assembly 220. This provides a fiber assembly 220 having an optical fiber 226 that terminates at a precisely predetermined position relative to a known reference point on outer end of the ferrule of the connecting apparatus 230.

Figure 11:
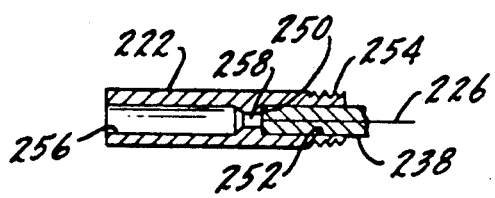
FIG. 11 is a detail sectional view of an adapter according to the present invention.

Optical fiber adapter 222, as shown in the detail of FIG. 11, is an adapter designed to hold a standard optical fiber connecting apparatus 230, such as an SMA 905 connector. The tip of ferrule 238 contacts an internal surface 250 in adapter 222. Adapter 222 is a cylindrical rod that fits into aperture 34A in optical element holder member 208. Adapter 222 provides a threaded outer surface 254, onto which nut 240 is threaded. Referring again to FIG. 9, nut 240 is screwed onto the threaded end 254 of adapter 222. As nut 240 moves in a lateral direction, it pulls ferrule 238 on the fiber cable assembly 220 into adapter 222 Consequently, the end of fiber 226 is drawn flush with bore surface 250. Adapter 222 also provides a second, central aperture 256 and an intermediate passage aperture 258 which connects bore 252 with aperture 256 and permits passage of a light beam through adapter 222 along the Z axis (FIG. 9).

Figure 12:
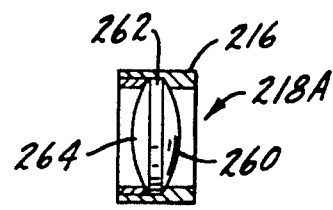
FIG. 12 is a detail sectional view of a lens assembly according to the present invention.

Housing 216 provides a retaining and alignment means for an optical element, such as lens 218. FIG. 12 shows a detail of one embodiment of the lens or other focussing element, a lens assembly 218 that may be disposed within housing 216. As shown, the optical device 218A is a convex type optical lens or prism for focussing a collimated light beam passing through retainer 32A and into an axial aperture 256 in adapter 222. Element 218 may be a single lens (FIG. 9) or may be a series of separate lenses 260, 262 and 264 as shown for lens 218A in FIG. 12. The focal point of the lens or other focussing element 218 is in the plane of surface 250 in adapter 222. This plane is the Z axis position of retainer 32A and the end of fiber 226 is disposed at exactly this position (see FIG. 11) when nut 240 is screwed onto the threaded surface 254 of adapter 222. The position of adapter 222 during manufacturing, is axially adjustable to a limited extent within aperture 34A of the optical element holder 208. When the focus of lens 218 (or 218A) is precisely on the end of fiber 226, in the plane of surface 246, the position of adapter 222 is fixed relative to the focal point of focusing element 218 in optical element holder 208 by epoxy glue or other fixing means.

The importance of the ability to focus a collimated light beam precisely on the end of the fiber 226 becomes clear when reference is made to FIGS. 1, 2, 6 and 8. As discussed above, the Z axis must remain fixed for the fiber optic element, in this case the fiber 226, if the positioner 24A is to operate properly. Accurately fixing the axial position of adapter 222 in the retainer 32A accomplishes this objective. Moreover, rotational motion of fiber optic assembly 220 is minimized or effectively eliminated by frictional force in connector 230. Fixing the positions of these two degrees of freedom (optic fiber rotation and Z axis displacement) provides the basis for operation of the positioner 24A to attain precise, accurate adjustment of the remaining four available degrees of freedom.

Figure 13:
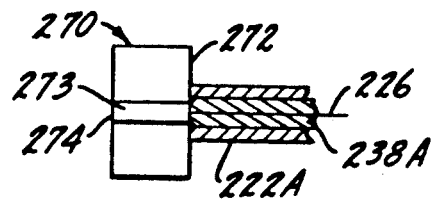
FIG. 13 is an alternative embodiment of a focussing member used in the present invention.

Optical element assembly 270, FIG. 13, contains a cylindrical, self-focussing graded index lens 273 (GRIN), widely used in the art. A GRIN lens may be used when the focal point of a convex lens assembly 218 or 218A, as described above, would require the focal point to be very close to or at the edge of the lens assembly. The use of GRIN lens 273 in assembly 270 requires modification of the adapter 222 and ferrule 238. A GRIN lens 273 will focus the light beam on a point on or very slightly beyond its exiting surface 272 opposite a surface 274 into which the light beam enters. The focal point a the surface of lens 273 requires disposing the end of the fiber 226 exactly at the surface 272 of the lens as shown in FIG. 13. A modification of the adapter 222 to provide a ferrule 238A (FIG. 13) which extends through the adapter aperture 256 (FIG. 11) and slightly beyond the end of adapter 222A is utilized.

Disposing assembly 270 and its GRIN lens 273 and fixing its position within a housing such as member 216 requires that the end of its ferrule be disposed at the inner end of aperture 34A in holder 208, FIG. 9. When a modified adapter 222A (FIG. 13) is mounted in optical element holder 208 the end of its ferrule 238A should contact surface 272 which is the focal point of lens 273. Thus, optical fiber cable assembly 220 may be removed and replaced in exactly the same Z axis position relative to retainer 32A, similar to the manner used with lens system assembly 218 (FIG. 9).

Retainer 32A may be manufactured from any hard, stable material, such as aluminum or plastic. Optical elements to be used within holder 208 are not limited to glass or quartz lenses, such as members 218, 218A, or 270, but may be other optical elements, such as LEDs. Thus, although the retainer 32A is shown and described in use with a fiber optic assembly 220, a source of a light beam, such as an LED, may be disposed in housing 216, and the positioner 24A may be used to align the axis of transmission of the LED to other optical elements not connected to retainer 32A. Once the utility and desirability of the features and advantages of the micropositioner 24A are understood, a person of ordinary skill in the art may use it in a variety of optical systems where precise position and attitude of an optical element are required. Accordingly the application is not limited to those embodiments shown and described above but the scope of the invention is only limited by the following claims.

The foregoing description does not cover the additional positioners 24B and 24C, nor their retainers 32B and 32C, in detail because these devices may be the same as the positioner 24A and its retainer 32A. All of these devices provide precise and accurate positioning of an optical fiber or other optical element in regard to virtually all available degrees of freedom (X, Y and Z axes, pitch, yaw, and rotation) with minimum losses.

I claim:

1. A positioner for accurately and precisely positioning and aligning an optical member in operative relation to an optical device with respect to at least three independent parameters, one of those parameters being displacement along a linear axis and one being an angular parameter of displacement about that linear axis, the positioner comprising:

a frame;

a tilt base member mounted on the frame for angular displacement about a given axis for alignment with respect to a given angular parameter;

retainer support means, mounted on the frame and mechanically connected to the tilt base member for movement therewith, the support means including a retainer support member axially movable along the given axis for alignment with respect to a given linear parameter;

retainer means, including a retainer member mounted on the retainer support member, for retaining an optical member in a predetermined position and alignment in the retainer member, the optical member being exposed to the optical device for transmission of radiation therebetween along a Z axis, the Z axis being orthogonal to the given axis, and defining an operational axis of the optical member;

tilt adjustment means, mounted on the frame and including a tilt adjustment anti-friction bearing engaging the tilt base member, for controlling the angular displacement of the tilt base member about the given axis to adjust alignment of the optical member with respect to the given angular parameter;

tilt biasing means for biasing the tilt base member into engagement with the tilt adjustment anti-friction bearing;

axial adjustment means, mounted on the frame and including an axial adjustment anti-friction bearing engaging the retainer support means, for controlling the movement of the support member along the given axis to adjust alignment of the optical member with respect to the given linear parameter; and axial bias means for biasing the retainer support means into engagement with the axial adjustment anti-friction bearing.

2. A positioner for positioning and aligning an optical member with an optical device for transmission of radiation therebetween, according to claim 1, in which:

the tilt biasing means comprises a leaf spring having one end affixed to the frame;

the tilt adjustment anti-friction bearing is mounted in a cage adjacent the other end of the tilt biasing leaf spring;

the tilt adjustment means includes an adjustment member mounted on the frame and engaging the other end of the tilt biasing leaf spring;

the axial biasing means comprises a leaf spring having one end affixed to the frame;

the axial adjustment anti-friction bearing is mounted in a cage adjacent the other end of the axial biasing leaf spring; and the axial adjustment means includes an adjustment member mounted on the frame and engaging the other end of the axial biasing leaf spring.

3. A positioner for positioning and aligning an optical member with an optical device for transmission of radiation therebetween, according to claim 2, in which each anti-friction bearing is a ball bearing and each adjustment member is a compound differential screw having an external thread and an internal threaded hole, the external thread having slightly different pitch than the threads of the internal threaded hole, each adjustment means further comprising a threaded rod having threads, the pitch of the threads on the threaded rod having the same pitch as the threads of the internal threaded hole.

4. A positioner for positioning and aligning an optical member with an optical device for transmission of radiation therebetween, according to claim 1, in which:

the optical member comprises a lens and a lens holder in which the lens is mounted, centered on the Z axis;

and the retainer member includes a lens holder socket for receiving the lens holder in a position such that the lens is located at a precisely determined position along the Z axis.

5. A positioner for positioning and aligning an optical member with an optical device for transmission of radiation therebetween, according to claim 4, in which:

the lens has a formal point at a precisely determined position, on the Z axis, within the lens holder;

and the optical member further comprises:

a fiber optic cable; and fiber optic cable mounting means for mounting the tip end of the fiber optic cable at the focal point of the lens, on the Z axis.

6. A positioner for positioning and aligning an optical member with an optical device for transmission of radiation therebetween, according to claim 5, in which:

the retainer member further includes an adapter socket axially aligned with the lens holder socket; and in which the fiber optic cable mounting means comprises:

a cylindrical adapter, mountable in the adapter socket, having an axial opening therethrough, one end of the axial opening in the adapter constituting a receptacle for receiving a ferrule comprising the tip end of a fiber optic cable;

the adapter receptacle terminating in an internal flange located in predetermined alignment with respect to the focal point of the lens.

7. A positioner for positioning and aligning an optical member with an optical device for transmission of radiation therebetween, according to claim 6, in which the internal flange in the adapter is coincident with the focal point of the lens.

8. A positioner for accurately and precisely positioning and aligning an optical member in operative relation to an optical device with respect to five independent parameters, three of those parameters being displacements along orthogonally oriented linear axes X, Y and Z and the other two being angular parameters of displacement about the X and Y axes, the positioner comprising:

a frame;

a tilt base member mounted on the frame for independent angular displacement about the X and Y axes for alignment with respect to each of the angular parameters independently of the others;

retainer support means, mounted on the frame and mechanically connected to the tilt base member for movement therewith, the support means including a retainer support member independently axially movable along the X and Y axes for alignment with respect to each of the X-based and Y-based displacement parameters independently of the other;

retainer means, including a retainer member mounted on the retainer support member, for retaining an optical member in a predetermined position and alignment in the retainer member, the optical member being exposed to the optical device for transmission of radiation therebetween along the Z axis, the Z axis defining an operational axis of the optical member;

tilt adjustment means, mounted on the frame and including two tilt adjustment anti-friction bearings each engaging the tilt base member, one for controlling the angular displacement of the tilt base member about the X axis independently of angular position about the Y axis and the other for controlling the angular displacement of the tilt base member about the Y axis independently of angular position about the X axis, to adjust alignment of the optical member with respect to the angular parameters;

tilt biasing means for biasing the tilt base member into engagement with both of the tilt adjustment anti-friction bearings;

axial adjustment means, mounted on the frame and including two axial adjustment anti-friction bearings each engaging the retainer support means, for controlling the displacement of the support member along each of the X and Y axes independently of position of the support member along the other axis to adjust alignment to the optical member with respect to the linear parameters; and axial bias means for biasing the retainer support means into engagement with both of the axial adjustment anti-friction bearings.

9. A positioner for positioning and aligning an optical member with an optical device for transmission of radiation therebetween, according to claim 8, in which:

the tilt biasing means comprises two leaf springs each having one end affixed to the frame;

each of the two tilt adjustment anti-friction bearings is mounted in a cage adjacent the other end of one of the tilt biasing leaf springs;

the tilt adjustment means includes two tilt adjustment members each mounted on the frame and each engaging the other end of one of the two tilt biasing leaf springs;

the axial biasing means comprises two leaf springs each having one end affixed to the frame;

each of the two axial adjustment anti-friction bearings is mounted in a cage adjacent the other end of one of the axial biasing leaf springs; and the axial adjustment means includes two axial adjustment members each mounted on the frame and each engaging the other end of one of the two axial biasing leaf springs.

10. A positioner for positioning and aligning an optical member with an optical device for transmission of radiation therebetween, according to claim 9, in which each anti-friction bearing is a ball bearing and each adjustment member is a compound differential screw, having an external thread and an internal threaded hole, the external thread having a slightly different pitch than the threads of the internal threaded hole, each adjustment means further comprising a threaded rod having threads, the pitch of the threads on the threaded rod having the same pitch as the threads of the internal threaded hole.

11. A positioner for positioning and aligning an optical member with an optical device for transmission of radiation therebetween, according to claim 8, in which:

the optical member comprises a lens and a lens holder in which the lens is mounted, centered on the Z axis;

and the retainer member includes a socket for receiving the lens holder in a position such that the lens is located at a precisely determined position along the Z axis.

12. A positioner for positioning and aligning an optical member with an optical device for transmission of radiation therebetween, according to claim 11, in which:

the lens has a focal point at a precisely determined position within the lens holder;

and the optical member further comprises:

a fiber optic cable; and means for mounting the tip end of the fiber optic cable at the focal point of the lens, on the Z axis.

13. A positioner for positioning and aligning an optical member with an optical device for transmission of radiation therebetween, according to claim 12, in which:

the retainer member further includes an adapter socket axially aligned with the lens holder socket;

and in which the fiber optic cable mounting means comprises:

a cylindrical adapter, mountable in the adapter socket, having an axial opening therethrough, one end of the axial opening in the adapter constituting a receptacle for receiving a ferrule comprising the tip end of a fiber optic cable;

the adapter receptacle terminating in an internal flange located in predetermined alignment with respect to the focal point of the lens.

14. A positioner for positioning and aligning an optical member with an optical device for transmission of radiation therebetween, according to claim 13, in which the internal flange in the adapter is coincident with the focal point of the lens.

15. A positioner for positioning and aligning an optical element with an optical device for transmission of radiation therebetween, according to claim 8, in which:

the retainer support means includes two interconnected parallelogram spring structures, oriented at 90° to each other, for isolating X axis linear movement from Y axis linear movement.

16. A positioner for positioning and aligning an optical member with an optical device for transmission of radiation therebetween, according to claim 8, in which:

the tilt base member has an orientation surface;

the two tilt adjustment anti-friction bearings engage displaced first and second points on the orientation surface of the tilt base member;

and the positioner further comprises a tilt orientation ball bearing that engages the tilt base member at a third predetermined point displaced from the first and second points, the alignment of the first, second and third points being such that one straight line through the first and third points is approximately orthogonal to a further straight line through the second and third points, and the two straight lines are parallel to the X and Y axes.

17. A positioner for positioning and aligning an optical member with an optical device for transmission of radiation therebetween, according to claim 16, in which:

the tilt biasing means comprises two leaf springs each having one end affixed to the frame;

each of the two tilt adjustment anti-friction bearings is mounted in a cage adjacent the other end of one of the tilt biasing leaf springs;

the tilt adjustment means includes two tilt adjustment members each mounted on the frame and each engaging the other end of one of the two tilt biasing leaf springs;

the axial biasing means comprises two leaf springs each having one end affixed to the frame;

each of the two axial adjustment anti-friction bearings is mounted in a cage adjacent the other end of one of the axial biasing leaf springs; and the axial adjustment means includes two axial adjustment members each mounted on the frame and each engaging the other end of one of the two axial biasing leaf springs.

18. A positioner for positioning and aligning an optical member with an optical device for transmission of radiation therebetween, according to claim 17, in which each anti-friction bearing is a ball bearing and each adjustment member is a compound differential screw having an external thread and an internal threaded hole, the external thread having a slightly different pitch than the threads of the internal threaded hole, each adjustment means further comprising a threaded rod having threads, the pitch of the threads on the threaded rod having the same pitch as the threads of the internal threaded hole.

19. A positioner for positioning and aligning an optical member with an optical device for transmission of radiation therebetween, according to claim 18, in which:

the optical member comprises a lens and a lens holder in which the lens is mounted, centered on the Z axis;

and the retainer member includes a socket for receiving the lens holder in a position such that the lens is located at a precisely determined position along the Z axis.

20. A positioner for positioning and aligning an optical member with an optical device for transmission of radiation therebetween, according to claim 19, in which:

the lens has a focal pint at a precisely determined position within the lens holder;

and the optical member further comprises:

a fiber optic cable; and means for mounting the tip end of the fiber optic cable at the focal point of the lens, on the Z axis.

21. Retainer means for connecting an optical fiber cable to a positioner to enable the positioner to position and align the optical fiber cable accurately and precisely in operative relation to an optical device, the retainer means comprising:

a retainer member having an axial opening therethrough centered on a Z axis, one end of the axial opening comprising a first socket for receiving a lens holder and the other end of the axial opening comprising a second socket for receiving an adapter;

a lens holder fitted into the first socket;

a lens, mounted in the lens holder, having a focal point at a predetermined location in the axial opening on the Z axis;

and an adapter, removably mounted on the end of the fiber optic cable and fitting into the second socket, for positioning the end of the fiber optic cable in the axial opening with the tip end of the fiber optic cable located at the focal point of the lens, the adapter being cylindrical and including an internal flange for determining the axial position of the tip end of a fiber optic cable inserted into the adapter.

22. Retainer means for connecting an optical fiber cable to a positioner to enable the positioner to position and align the optical fiber cable accurately and precisely in operative relation to an optical device, the retainer means comprising:

a retainer member having an axial opening therethrough centered on a Z axis, one end of the axial opening comprising a first socket for receiving a lens holder and the other end of the axial opening comprising a second socket for receiving an adapter;

a lens holder fitted into the first socket;

a lens, mounted in the lens holder, having a focal point at a predetermined location in the axial opening on the Z axis;

and an adapter, removably mounted on the end of the fiber optic cable and fitting into the second socket, for positioning the end of the fiber optic cable in the axial opening with the tip end of the fiber optic cable located at the focal point of the lens, the adapter being a metal adapter of generally cylindrical configuration which defines an axial direction and fitting closely over a ferrule, the metal cylinder having an internal flange to be engaged by the ferrule in end-abutting contact, the end of the optical fiber being ground to be substantially within a plane having a predetermined position along the axial direction, the position of the lane being determined by the internal flange in the adapter cylinder, and the retainer means including coupling means for securing the ferrule in place in the predetermined axial position within the adapter as determined by the internal flange.

23. Retainer means according to claim 22 in which the adapter is permanently mounted in the retainer member, and in which the coupling means comprises a rigid connection between the end of the fiber optic cable and the adapter.

* * * * *